United States Patent Office 3,154,454
Patented Oct. 27, 1964

3,154,454
ALLYL RESIN LAMINATES
Arthur V. Dupuis, Baltimore, Md., assignor to FMC Corporation, a corporation of Delaware
No Drawing. Filed Aug. 21, 1961, Ser. No. 132,606
11 Claims. (Cl. 156—332)

This invention relates to an improved process for the manufacture of laminates, and to the novel products produced thereby, of enhanced properties and utility. Particularly, this invention relates to improvements in laminates having a decorative or other sheet laminated directly to a rigid core material, wherein the laminating binder is a diallyl phthalate resin.

Decorative laminates, in general, comprise an external coating of printed paper laminated to a core which has the properties of strength and workability required for the particular end use. As bonding agent for decorative laminates is used, ideally, a resinous material which penetrates the paper and is adhesive to the core, and which also forms a protective film over the paper, thereby guarding the paper against abrasion and physical and chemical attack. The laminating resin should also impart a hard, attractive surface to the laminate.

In copending United States application Serial No. 824,766, filed July 3, 1959, now Patent No. 3,049,458, is described a process for producing such a laminate, whereby a sheet of standard decorative paper in a matrix of diallyl phthalate resin is laminated directly to a core material of appropriate strength and rigidity for the application desired. The preparation of these laminates was made possible by the discovery that a relatively small change in diallyl phthalate resin content in the impregnated paper produces a remarkable change in the thickness, and in fact the very existence, of a resin film on the surface of the decorative paper.

In general, laminates produced by the process described in application Serial No. 824,766, now Patent No. 3,049,458, have durable, attractive surfaces, free of the defects of "dull spots" and pitting, and unaffected by moisture, solvents or harsh chemicals. However, even that process is accompanied by occasional practical difficulties. For example, when standard decorative papers are used in the production of large size diallyl phthalate resin laminates, it is sometimes difficult to obtain a uniform high gloss finish over the entire surface of the laminate, due apparently to uneven resin film thickness over the paper surface, so that the paper fibers lie closer to the surface in some areas than in others, thereby producing undesirable variations in the appearance, especially the gloss, of the laminate surface.

I have now discovered that the surface gloss and appearance of diallyl phthalate paper laminate surfaces may be substantially improved by including in the diallyl phthalate formulation about 1–15% of a finely divided solid having a particle size of less than one micron. By so doing, the thickness of the resin film on the surface of the laminate is roughly doubled, although the reason for this phenomenon is not completely understood, and is accompanied by a marked improvement in the gloss and the appearance of the laminate surface, as well as substantially improved resistance to both wet and dry abrasion. For example, by employing the process of this invention a specular gloss of 85–95% is consistently achieved. This improved appearance is in marked contrast with the normal effect of adding a dry powder to a resin film, since the general effect of fillers is to decrease, not increase the lustre of the surface. When the finely divided solid employed herein has a refractive index in the range of about 1.5–1.6, the effect is a clear resin film. When the solid has a refractive index outside this range, the film produced is no longer clear, but it still has a very high gloss and, in contrast to the normal effect of pigments on resinous films, substantially improved abrasion resistance.

The resinous component of the laminate is derived from thermosetting polymers of diallyic phthalates, including the isomeric orthophthalates, isophthalates and terephthalates, and the methallyl as well as allyl esters. Diallyl phthalate polymerizes by addition polymerization through the allylic unsaturation, first forming a soluble, thermoplastic polymer which is relatively stable and is soluble in a wide variety of organic solvents, and which on further polymerization is changed to an infusible, insoluble thermoset resin having excellent physical and chemical properties. Polymers of diallyl and dimethallyl orthophthalate and isophthalate are preferred for use herein. These polymers are generally described as diallyl phthalate in the following description, which applies equally to all of these polymers.

Thermoplastic diallyl phthalate resins may be prepared by standard polymerization techniques, such as emulsion, solution or bulk polymerization, usually with a peroxide catalyst. The polymerization reaction is relatively slow, and may be stopped before gelation of the polymer, by procedures such as lowering the temperature or quenching the reactants, or destroying the catalyst, to form a thermoplastic polymer which contains residual vinyl unsaturation and is soluble in such common solvents as low molecular weight ketones, dioxane, ethyl acetate, and benzene. The molecular weight of the thermoplastic polymer is generally in the range of about 2,500 to 25,000, with a number average below 10,000. Processes useful for the preparation of this polymer are described in U.S. Patents 2,370,578 and 2,377,095.

To obtain the beneficial results described herein, about 90% to 100% of the diallyl phthalate used in impregnating the decorative paper should be in the form of this thermoplastic polymer, and the remaining 0 to 10% as allylic monomer to enhance flow during cure. Allylic monomers other than diallyl phthalates may be employed herein, such as diallyl maleate or diallyl diglycollate, and the use of such monomers may impart particular preferred properties to the final product. At over 95% polymer, slightly higher pressures may be needed for adequate flow during curing, to avoid pitting and flaking of the surface. At less than 90% polymer, the dried paper tends to become sticky.

Present also in the impregnating solution is a catalytic amount, normally about 2% to 5%, by weight of diallyl phthalate, of an organic peroxide, to catalyze the final cure of the resin. There is no advantage to the use of more than 5% catalyst. At least about 1% catalyst is required for complete cure. This catalyst may be any organic peroxide or hydroperoxide, such as tertiary butyl perbenzoate, benzoyl peroxide, tertiary butyl hydroperoxide, and other catalysts which are effective at the curing temperature but do not decompose during the drying cycle of the impregnated paper.

It is also preferable to include an effective amount, normally about 2% to 5%, by weight of diallyl phthalate, of an internal parting agent, such ase lauric acid, carnaubua wax or beeswax. External release agents or other processing techniques may also be used.

To prepare the laminates of this invention, all of these components are first dissolved in a volatile solvent, which may be any of the usual solvents useful for dissolving diallyl phthalate polymer. Useful solvents include low molecular weight ketones such as acetone, methyl ethyl ketone and methyl isobutyl ketone, aromatics such as benzene, toluene, xylene and isopropyl benzene, esters such as ethyl acetate and butyl acetate, other solvents such as dimethyl formamide, and many other solvents which can be evaporated out after impregnation of the paper. It may be preferred to use a mixture of solvents, in order to control the rate of evaporation from the paper. Solutions ranging from about 25% to 70% solids may be used, depending on the particular solvent system used. It is especially convenient to operate in the range of about 35% to 50% solids, for most solvents. The higher the resin concentration, the higher the resin pick-up by the paper during impregnation. Since the viscosity of a solution of given resin content depends on the solvent, as well as do the temperature and rate at which the solvent may be evaporated off, the choice of solvent will depend to some extent on the particular processing technique which is adopted for preparing the laminating stock.

The final essential ingredient is about 1–15%, by weight of total diallyl phthalate, of a finely divided solid having a particle size of less than one micron. This solid may be a silica aerogel, such as is described in U.S. Patent 2,093,454; these aerogels are low density, porous powders, in the desired particle size range. Other silicious materials such as silica may also be used, or other materials having a particle size range of less than one micron, such as the aluminas, bentonite, kaolin, mica, and the like.

The decorative paper may be any of the standard machine-finish or supercalendered saturating papers provided for laminating. Supercalendered papers are preferred and are obtained by densifying standard machine-finish papers two to four fold. The usual calendering process in paper manufacture produces so-called "machine-finish" papers, formed by passing the paper as it is formed, from water slurries on a Fourdrinier machine, through a series of metal rolls. Supercalendering essentially carries this process further, and is effected by using alternating metal and resilient surfaced rolls in pairs, thereby both densifying the paper and smoothing one side preferentially. These processes are well known in the paper making art, and are discussed, for example, in the book "Modern Pulp and Paper Making," Third Edition, Calkin and Witham, Reinhold, New York (1957), pp. 392–395.

These decorative papers are normally alpha-cellulose, absorbent papers, pigment-loaded for opacity, printed with solvent-resistant and heat-resistant inks. The papers may be characterized further by their Densometer readings. The Gurley Densometer is the standard device for measuring porosity of paper. Supercalendered paper has a Densometer reading of 250–450 seconds per 400 ml., and machine finish paper has a Densometer reading of 30–80 seconds per 400 ml. Papers of either about 5 mils thickness (3–4 mils if supercalendered) having a basis weight of 60–65 pounds per 3000 square feet, or about 9 mils thickness (9–8 mils if supercalendered) having a basis weight of 90–105 pounds per 3000 square feet, are the most common papers available in commerce, and are all usable in the instant invention.

The decorative laminates of this invention are obtained, briefly, by impregnating the decorative paper with a solution comprising (a) a diallyl compound, 90–100 of said diallyl compound being a thermoplastic diallyl phthalate polymer and the other 0–10% being a monomeric diallyl ester of a dicarboxylic acid, (b) a catalytic amount of an organic peroxide, (c) preferably an effective amount of a release agent, (d) about 1–15% of a finely divided solid having a particle size of less than one micron, and (e) a volatile solvent, and drying said impregnated paper, until said paper is impregnated with a total of about 53 to 69% of diallyl phthalate, by weight of paper, and has a residual volatile content of less than 8%, measured as material volatile after heating the dried paper for 10 minutes at 420° F.; laminating the dried impregnated paper to the surface of a core material, at a temperature and pressure and for a time sufficient to convert the diallyl phthalate to a thermoset resin, thereby forming a laminate coated with a resin surface of about 3 to 8 mils in thickness.

The specific proportion of diallyl phthalate used depends on the thickness of the decorative paper employed. When decorative paper of 3–5 mils thickness contains 63 to 67%, by weight of impregnated paper, of total diallyl phthalate, or when decorative paper of 7–9 mils thickness contains 53 to 57% of diallyl phthalate, the laminated product has a uniform, adherent resin coating, about 3 to 6 mils thicker than the coating obtained in the absence of the powdery component of this invention.

The decorative paper is impregnated using conventional equipment and techniques, wherein the paper is passed through a tank containing the impregnating solution. The amount of resin pickup may be controlled by adjusting the rate of passing the paper through the solution, varying the type of solvent system employed and the percent solids in the impregnating solution, or using metering rolls, doctor blades, transfer rolls or other standard saturating techniques. The impregnation is conveniently carried out at room temperature, followed by evaporation of the solvent at elevated temperature, in a tunnel dryer arranged either horizontally or vertically.

Complete impregnation of the paper web is essential, since improper saturation may result in the formation of pits and craters in the surface of the cured laminate, and may even result in delamination through the thickness of the paper. The amount of resin on the paper is readily determined by weighing samples of dried impregnated paper after each dip into the impregnating solution. Since heavily coated papers tend to adhere to the rolls of some types of coaters in commercial use, standard techniques, such as the use of a doctor blade on the unprinted side of the paper so that the thinner film dries rapidly enough not to stick to the rolls, may be employed in practice.

After the desired resin content has been obtained in the paper, the impregnated papers are dried to remove the volatile solvent. If the paper has been impregnated by a process requiring more than one dip through the laminating solution, at least a partial drying should be effected between successive dips. The drying temperature should be carefully controlled, to avoid premature cure of the resin at this stage. The drying temperature and time will, of course, depend on the amount of solvent to be removed, the solvent system used and the speed of the paper through the drying ovens. Drying should be carried out gradually, to avoid the formation of craters in the final product. Drying temperatures in the range of about 150 to 275° F., in a two zone system, will completely remove acetone solvent, whereas slightly higher ranges may be used for other solvents. In general, no more than 8% volatiles should remain in the paper after drying, with a preferred residual volatile content in the range of 3% to 5%. Residual volatile content, after normal drying, is measured by the weight loss observed on subjecting the dried paper to a temperature of 320° for 10 minutes.

These impregnated papers may be bent and rolled without cracking, and cut without flaking or chipping, and may be stored for prolonged periods without blocking or advancement in cure.

Decorative laminates can be prepared on almost any core material, of high, medium and low density, employing the process of this invention. Typical core materials include plywood, lumber core hardboard, particle board, cement-asbestos and gypsum board. All these boards should have plane and parallel surfaces, and uniform compressibility. The surface of the board to be coated should be sanded smooth if necessary. The board should either be thermally stable at the laminating temperature, or special precautions may be required; for example, if a urea formaldehyde resin binder is present, or the boards are of high moisture content, it is preferred to pre-dry the boards to a minimum moisture and volatile content. Since it is desirable to avoid steam formation and the formation of other volatiles during lamination, for example the calcining of gypsum board with heat. Such boards should be pretreated before lamination.

To prevent warping, either the core material should be balanced with a resin surface on both sides, or the reverse side should be protected with some inexpensive resin film. Typically a sheet of phenolic resin impregnated kraft paper is used. The type and character of the core material used in the decorative laminate will determine the extent to which balancing or equalization is required. All types of hardboard and most plywoods must be balanced to a greater or lesser degree to compensate for the differential in dimensional stability between the core and the decorative face and to equalize the rate of water absorption through the two faces. Boards which have a high internal bond strength and a high resistance to moisture do not require extensive balancing. Certain types of particle board, particularly those with high resin content outer faces, or wood veneered faces, may not require additional equalization.

Laminating may be accomplished using a standard platen press with multiple openings. Layers of decorative board can be cured either "face-to-face," using a polishing plate finished on both sides, or "back-to-back" using two polishing plates, each finished on one side only. Either stainless steel or aluminum cauls, of any desired finish, are normally used. The cauls should be prepared by the use of an external mold release such as lauric acid or silicone release agents. Thereafter external release is necessary only periodically during a continuous operation.

The impregnated paper is laminated to the board at a temperature and pressure and for a time sufficient to convert the diallyl phthalate to a thermoset resin. The laminating pressure need only be high enough to cause the resin to flow and assume a continuous film across the metal caul plate as well as effecting some flow into the core for adhesion. This will depend on such factors as the density and surface of the core and the flow characteristics of the impregnated paper. Pressures approaching contact pressure, and as high as 800 p.s.i., have been used successfully. At low laminating pressures diallyl phthalate resin flow sufficiently to produce a uniform finish of any desired gloss. For most laminates a convenient pressure is in the range of 100–250 p.s.i. If it is desired to laminate at pressures in excess of 350 p.s.i., it may be advisable to use paper in which the resin flow has been retarded by advancing the cure of a small portion of the resin during the drying operation, since high laminating pressures are known to reduce the thickness of the resin film on the laminate. In contrast, however, with results observed in the absence of the powdery additive of this invention, even with impregnated papers containing less than about 63% resin for 3–5 mil paper, or 53% for 7–9 mil paper, a useful resin film may be obtained when the compositions of this invention are employed, even at very low laminating pressures.

The curing temperature should be high enough to activate the catalyst, and to provide a reasonable rate of cure. For commercial operation, the shorter the curing cycle the greater the productivity, so that high curing temperatures are preferred from practical considerations. In practice the maximum laminating temperature may be limited by the stability of the core and/or discoloration of the overlay paper fibers. Curing temperatures up to 400° F. for up to five minutes have been used without charring such core materials as "Masonite." Lower temperatures of course require a longer curing time, and a temperature range of about 285° F. to 370° F. is preferred, and within this range the rate of polymerization is reasonable, with no significant decomposition and degradation of the laminates. It is not necessary to cool the cured laminate in the press before removal.

In preparing a laminate designed for use under especially rigorous conditions, such as for counter tops, an overlay paper may be used with the decorative paper. Overlay papers are unpigmented papers approximately 2–3 mils in thickness, and are impregnated and prepared for laminating as are the decorative papers, although normally without the use of the powdery additive of this invention, then laid on top of the decorative paper in the laminating press, and cured and laminated simultaneously with and under the same conditions as the decorative paper. Because of their relative absorbency, overlay papers are normally impregnated to a resin content in the range of about 80–85%. Overlay sheets may impart a total resin film of as much as 12 mils above the surface of the decorative paper.

The laminates produced according to this invention have a flat, undistorted surface, since volumetric shrinkage is less than 1% in advancing from thermoplastic diallyl phthalate polymer to the fully cross-linked thermoset resin. The surface may have any desired finish, satin, gloss or flat, depending on the caul surfaces employed. Whatever the finish, the lustre and visual appearance is enhanced through use of the powdery additive described herein. The products have high dimensional stability, and outstanding resistance to abrasion, heat, wear, weathering, and the action of harsh chemicals.

The practice of this invention is illustrated further in the following examples. All parts are by weight unless otherwise indicated. Properties are determined by standard ASTM and NEMA methods; specular gloss is compared with black glass as 100%.

*Example I*

A typical diallyl phthalate thermoplastic polymer, used in this and the succeeding examples, was prepared as follows: 8860 pounds of monomer, 622 pounds of isopropanol (91% by volume) and 75 pounds of hydrogen peroxide (50.4% $H_2O_2$) were charged to a 1500 gallon stainless steel reactor, thoroughly agitated and heated to a pot temperature of 104–108° C. at total reflux. After 10 hours the viscosity of the reaction mixture had increased to 27 cps. at 106° C., as measured by a Bendix Untraviscoson computator. The batch was cooled, to obtain a reaction product having a viscosity of 425 cps. at 25° C. This polymeric reaction product, which consists of approximately 27% polymer, 67% unreacted monomer and 6% isopropanol, was mixed intimately with 48,000 pounds of isopropanol (91% by volume), and the converted polymer precipitated at 0° C. The solid polymer was separated by filtration and dried, to yield a 27.6% conversion of monomer to polymer. Properties of a polymer obtained by this process are:

| | |
|---|---:|
| PPV, cps., at 25° C. | 354 |
| Softening range °C | 80–105 |
| Iodine No. | 55 |
| Sp. gr. at 25° C. (ASTM D792–50) | 1.267 |

The PPV given above is the "precipitated polymer viscosity," the viscosity measured at 25° C. of a 25.0% solution of polymer in monomer.

The product is a thermoplastic solid possessing residual unsaturation. It is readily soluble in low molecular weight ketones, benzene, ethyl acetate and other solvents, and insoluble in alcohols, water and aliphatic hydrocarbons. This polymer was employed in the following examples:

*Example II*

A printed supercalendered alpha-cellulose paper of 8 mil thickness, printed with a delta-sliced walnut decorative pattern, was coated by the "dip and flow" method, by passing at the rate of 6 feet per minute into a solution of the following composition:

| | Parts |
|---|---|
| Diallyl orthophthalate polymer | 93 |
| Diallyl orthophthalate monomer | 7 |
| Silica aerogel, 0.1–0.2 micron | 8 |
| Lauric acid | 3 |
| Tert.-butyl perbenzoate | 3 |
| Acetone | 175 |

The coated paper was dried at 220° F. for 6 minutes, to produce a tack-free impregnated paper having a resin content of 53% and a volatile content of 5.6%. Resin content was measured by weighing samples of untreated and coated paper and assigning the weight gain as resin content. Percent volatiles was measured as the weight loss after heating for 10 minutes at 320° F. This paper was laminated to a core of ¼" thick three-ply all birch plywood which had been dried for 5 minutes at 350° F. The layup consisted of a slip caul (to protect the laminate from the surface of the press platen) a sheet of glassine separator paper, a backing sheet of phenolic impregnated kraft paper, the plywood core, the diallyl phthalate impregnated decorative sheet, and a polished steel caul plate. The layup was cured in a laminating press by heating for 12 minutes at 310° F., under a pressure of 225 p.s.i. The resultant laminate showed a 60° specular gloss of 90%, a smooth, even resin film 3.5 mils in thickness on the surface of the laminate, and a NEMA abrasion resistance of 420 cycles.

Repeating this procedure, omitting the silica aerogel from the laminating solution, yielded a product having a 60° specular gloss of 75%, a resin film of 0.5 mil, and abrasion resistance of 60 cycles.

*Example III*

A printed supercalendered absorbent paper, 4 mils in thickness, was impregnated by passing the paper once, at a rate of 5 feet per minute, into a solution of the composition:

| | Parts |
|---|---|
| Diallyl orthophthalate polymer | 90 |
| Diallyl orthophthalate monomer | 10 |
| Silica aerogel, 0.1–0.2 micron | 10 |
| Tert.-butyl perbenzoate | 2 |
| Acetone/toluol 90/10 | 150 |

The impregnated paper was dried at 220° F. for 9 minutes, to produce a tack-free paper having a resin content of 63% and a volatile content of 5.9%. This paper was laminated to a pre-dried core of Duolux tempered Masonite, a compressed hardboard ⅜ inch in thickness and having a density of 1.1 g./cc., which had been pre-dried for 5 minutes at 350° F., using mirror finish stainless steel cauls and lauric acid as an external caul release agent, in a layup as described in Example II, for 15 minutes at 300° F. under a pressure of 225 p.s.i. Microscopic examination showed a resin film 4.5 mils in thickness in a polished section of this laminate. The 60° specular gloss of this sample was 95% based on black glass as 100%.

*Example IV*

A printed machine finish alpha-cellulose paper of about 9 mils thickness was coated by passing the paper at the rate of 10 feet per minute into a solution of the following composition:

| | Parts |
|---|---|
| Dimethallyl orthophthalate polymer | 93 |
| Dimethallyl orthophthalate monomer | 7 |
| Finely divided silica | 9 |
| Lauric acid | 2 |
| Tert.-butyl perbenzoate | 4 |
| Methyl ethyl ketone | 175 |

The dimethallyl phthalate polymer was prepared following the procedure of Example I. The coated paper was dried at 218° F. for 9.5 minutes, to produce a tack-free impregnated paper having a resin content of 54% and a volatile content of 5.3%. The paper was laminated to a ¾" thick medium density particle board which had been pre-dried for 10 minutes at 350° F. The layup was the same as in Example II, using satin finish stainless steel cauls. After a curing cycle of 12 minutes at 320° F. and 180 p.s.i. pressure, a finished laminate was obtained. Microscopic examination of polished sections of this laminate showed a uniform resin film 2 mils in thickness across the face of the laminate.

*Example V*

A 7 mil printed machine finish alpha-cellulose decorative paper was coated by passing at the rate of 10 feet per minute into a solution of the following composition:

| | Parts |
|---|---|
| Diallyl orthophthalate polymer | 100 |
| Silica aerogel | 12 |
| Capric acid | 1 |
| Tert.-butyl perbenzoate | 3 |
| Methyl ethyl ketone | 100 |
| Acetone | 100 |

The coated paper was dried at 225° F. for 25 minutes to produce a tack-free impregnated paper having a resin content of 59% and a volatile content of 5.7%. The paper was laminated to asbestos cement board of 3/16" thickness which had been pre-dried for one and one half hours at 350° F. The layup consisted of a slip caul, a sheet of glassine separator paper, a sheet of phenolic impregnated kraft paper, the board core, the diallyl phthalate impregnated decorative sheet, and a glossy chromed steel caul plate. The laminating cycle was 14 minutes at 305° F. and 175 p.s.i. pressure. The glossy laminate produced was found to have a uniform thick resin film on its surface, a specular gloss of 93%, and a NEMA abrasion resistance of 380 cycles.

*Example VI*

An overlay paper of about 3 mils thickness was coated by the "dip and flow" method, by passing at the rate of 10 feet per minute into a solution of the following composition:

| | Parts |
|---|---|
| Diallyl isophthalate polymer | 95 |
| Diallyl orthophthalate monomer | 5 |
| Silica aerogel | 12 |
| Tert.-butyl peroxide | 3 |
| Lauric acid | 3 |
| Acetone | 200 |

The coated paper was dried at 215° F. for 10 minutes, to produce a tack-free impregnated paper having a resin content of 80% and a volatile content of 5.4%. The paper was laminated to a core of ¾" walnut veneered particle board, in a layup as described in Example II, using a mirror finish stainless steel caul plate. The layup was cured in a laminating press by heating for 10 minutes at 325° F., under a pressure of 225 p.s.i. The laminate was removed from the press and the cauls stripped off, to produce a smooth, mirror finish laminate of very high gloss. Microscopic examination of a polished section of this laminate showed a smooth, even resin coating of 4.5 mils thickness on the surface of the laminate, and a NEMA abrasion resistance of 550 cycles.

*Example VII*

Non-woven rayon overlay paper of about 3 mils thickness (basis weight 18 pounds per 3000 square feet) was coated by the "dip and flow" method, by passing at the rate of 15 feet per minute into a solution of the following composition:

| | Parts |
|---|---|
| Diallyl phthalate polymer | 93 |
| Diallyl phthalate monomer | 7 |
| Lauric acid | 4 |
| Tert.-butyl perbenzoate | 3 |
| Methyl ethyl ketone | 175 |

The coated paper was dried at 200° F. for 10 minutes, to produce a tack-free impregnated paper having a resin content of 82% and a volatile content of 4.2%. This paper was laminated in combination with the decorative paper described in Example IV, to a ¼" thick three-ply all birch plywood which had been dried for 5 minutes at 350° F. The layup consisted of a slip caul, a sheet of glassine separator paper, a balancing sheet of phenolic impregnated kraft paper, the plywood core, the decorative sheet, the overlay sheet, and a polished aluminum caul plate. The layup was cured in a laminating press by heating for 13 minutes at 315° F., under a pressure of 200 p.s.i. The resultant laminate showed excellent surface gloss and an 8.5 mil resin film over the printing on the decorative paper.

*Example VIII*

A 9 mil supercalendered decorative paper was saturated by the dip-and-flow method by passing at the rate of 10 feet per minute into a solution of the following composition:

| | Parts |
|---|---|
| Diallyl orthophthalate polymer | 93 |
| Diallyl maleate monomer | 7 |
| Bentonite | 15 |
| Myristic acid | 4 |
| Benzoyl peroxide | 2 |
| Methyl ethyl ketone | 100 |
| Acetone | 100 |

The coated paper was dried at 225° F. for 25 minutes to produce a tack-free impregnated paper having a resin content of 59% and a volatile content of 5.3%. The paper was laminated to a ¼" thick three-ply all birch plywood core which had been dried for 5 minutes at 350° F., using polished aluminum caul plates. The layup was cured in a laminating press by heating for 13 minutes at 315° F., under a pressure of 200 p.s.i. The resultant laminate showed excellent surface gloss.

It is apparent that this invention is susceptible to numerous modifications within the scope of the disclosure, and it is intended to include such variations within the scope of the following claims.

I claim:

1. The method of producing decorative laminates which comprises the steps of impregnating a sheet of decorative paper about 3 to 9 mils in thickness with a solution comprising (a) a diallyl compound, 90–100% of said diallyl compound being a thermoplastic diallyl phthalate polymer and the other 0–10% being a monomeric diallyl ester of a dicarboxylic acid, (b) a catalytic amount of an organic peroxide, (c) about 1–15%, by weight of total diallyl compound, of a finely divided solid selected from the group consisting of silica aerogel, silica, alumina, bentonite, kaolin and mica, having a particle size of less than 1 micron, and (d) a volatile solvent, and drying said impregnated paper until said paper is impregnated with a total of about 53% to 69% of diallyl compound, by weight of paper, and has a residual volatile content of less than about 8%, measured as material volatile after heating the dried paper for 10 minutes at 320° F.; and laminating the dried impregnated paper to the surface of said core material, at a temperature and pressure and for a time sufficient to convert the diallyl phthalate to a thermoset resin.

2. The method of claim 1 wherein said finely divided solid is silica aerogel.

3. The method of claim 1, wherein said finely divided solid is bentonite.

4. The method of claim 1, wherein said finely divided solid is alumina.

5. The method of claim 1, wherein said finely divided solid is silica.

6. The method of claim 1, wherein said finely divided solid is kaolin.

7. The method of claim 1, wherein said finely divided solid is mica.

8. The method of claim 1, wherein said monomeric diallyl ester is diallyl maleate.

9. The method of claim 1, wherein the monomeric diallyl ester of a dicarboxylic acid is diallyl phthalate monomer.

10. The method of claim 1, wherein the decorative paper has been densified by the supercalendering process to a Gurley Densometer reading of 250 to 450 seconds per 400 ml.

11. The method of claim 1, wherein a sheet of unpigmented overlay paper about 2 to 3 mils in thickness is impregnated with (a) a diallyl compound, 90–100% of said diallyl compound being a thermoplastic diallyl phthalate polymer and the other 0–10% being a monomeric diallyl ester of a dicarboxylic acid, (b) a catalytic amount of an organic peroxide, and (c) a volatile solvent, and drying said paper, until said overlay paper is impregnated with a total of about 80% to 85% diallyl compound, by weight of paper, and has a residual volatile content of less than about 8%, measured as material volatile after heating the dried paper for 10 minutes at 320° F., and the impregnated overlay paper is laid on the impregnated decorative paper prior to lamination.

References Cited in the file of this patent

UNITED STATES PATENTS

| 2,370,578 | Pollack et al. | Feb. 27, 1945 |
| 2,437,508 | D'Alelio | Mar. 9, 1948 |
| 2,561,362 | Guillot | July 24, 1951 |
| 2,563,774 | Debing | Aug. 7, 1951 |
| 2,632,752 | Anderson | Mar. 24, 1953 |
| 3,049,458 | Willard | Aug. 14, 1962 |